(12) United States Patent
Jiang et al.

(10) Patent No.: US 10,132,245 B2
(45) Date of Patent: Nov. 20, 2018

(54) FUSIBLE LINK WITH COULOMB DAMPING

(71) Applicant: Hamilton Sundstrand Corporation, Charlotte, NC (US)

(72) Inventors: Yiwei Jiang, Rockford, IL (US); Michael R. Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 92 days.

(21) Appl. No.: 15/137,276

(22) Filed: Apr. 25, 2016

(65) Prior Publication Data

US 2017/0306851 A1 Oct. 26, 2017

(51) Int. Cl.
F02C 7/32 (2006.01)
F16F 15/02 (2006.01)
F16H 57/025 (2012.01)

(52) U.S. Cl.
CPC ............ F02C 7/32 (2013.01); F16F 15/02 (2013.01); F16H 57/025 (2013.01); F05D 2260/30 (2013.01); F05D 2260/96 (2013.01)

(58) Field of Classification Search
CPC .......... F02C 7/32; F16F 15/02; F16H 57/025; F05C 2260/30; F05D 2260/96; F05D 2260/30; B62D 7/22
See application file for complete search history.

(56) References Cited

U.S. PATENT DOCUMENTS

| 5,122,007 A * | 6/1992 | Smith | F16G 11/00 403/165 |
|---|---|---|---|
| 6,212,974 B1 | 4/2001 | Van Duyn | |
| 6,669,393 B2 * | 12/2003 | Schilling | F02C 7/20 244/54 |
| 7,093,996 B2 * | 8/2006 | Wallace | B64D 27/26 403/78 |
| 2002/0079630 A1 * | 6/2002 | Bachmeyer | F16F 3/087 267/140.13 |
| 2014/0174252 A1 | 6/2014 | Davis et al. | |
| 2014/0314546 A1 * | 10/2014 | Davis | F01D 21/045 415/124.1 |
| 2016/0083101 A1 * | 3/2016 | Ronski | F16F 9/10 60/783 |
| 2017/0260907 A1 * | 9/2017 | Jiang | F02C 7/32 |

(Continued)

FOREIGN PATENT DOCUMENTS

| EP | 1010878 A2 | 6/2000 | |
|---|---|---|---|
| EP | 2559883 A2 * | 2/2013 | ............... F02C 7/32 |

(Continued)

OTHER PUBLICATIONS

Search Report dated Oct. 16, 2017 in Application No. GB 1706467. 6, 5 Pages.

Primary Examiner — Vicky A Johnson

(74) Attorney, Agent, or Firm — Cantor Colburn LLP

(57) ABSTRACT

A link assembly between an engine and a gearbox includes a male link coupled to the engine or the gearbox, a female link coupled to the engine or the gearbox, wherein the female link receives the male link to allow translation of the male link relative to the female link and to form a radial interface, wherein the radial interface dampens translation of the male link relative to the female link, and a pin releasably coupled to the male link and the female link to selectively retain the male link and the female link.

18 Claims, 3 Drawing Sheets

(56) References Cited

U.S. PATENT DOCUMENTS

| | | | |
|---|---|---|---|
| 2017/0260908 A1* | 9/2017 | Jiang | F02C 7/32 |
| 2017/0260909 A1* | 9/2017 | Jiang | F02C 7/32 |
| 2017/0260910 A1* | 9/2017 | Jiang | F02C 7/32 |

FOREIGN PATENT DOCUMENTS

| | | |
|---|---|---|
| EP | 3219962 A1 | 9/2017 |
| EP | 3219963 A1 | 9/2017 |
| WO | 2014100817 A1 | 6/2014 |
| WO | 2015041855 A1 | 3/2015 |

* cited by examiner

FUSIBLE LINK WITH COULOMB DAMPING

BACKGROUND

The present invention relates generally to support structures, and more particularly to a mounting link between an engine structure and an attached structure such as an auxiliary gearbox.

Aircraft gas turbine auxiliary gearboxes are expected to withstand a variety of loads, from routine vibrational loads to sudden or extreme shocks caused by hard landings. The most extreme loads come from so-called "blade-off" events, when blades of the engine detach due to impacts or the like, causing severe shocks and often major damage to the working engines. Blade-off event loads are extremely unpredictable, but can be more than an order of magnitude stronger than any other sudden or extreme shock gas turbine engines are expected to experience, such as impacts due to hard landings. Extreme loads can cause damage to the gearbox itself, as well as to attached peripheral systems driven by the gearbox. In addition, extreme loads that damage or disconnect parts of the gearbox from the engine can result in potentially dangerous oil leakages. For all of these reasons conventional gearboxes and gearbox connections are constructed to rigidly withstand all anticipated loads. Often, conventional gearboxes and gearbox connections may require additional material or be heavier to withstand such extreme loads.

BRIEF SUMMARY

According to an embodiment, a link assembly between an engine and a gearbox includes a male link coupled to the engine or the gearbox, a female link coupled to the engine or the gearbox, wherein the female link receives the male link to allow translation of the male link relative to the female link and to form a radial interface, wherein the radial interface dampens translation of the male link relative to the female link, and a pin releasably coupled to the male link and the female link to selectively retain the male link and the female link.

According to an embodiment, a gearbox assembly to attach to an engine includes a gearbox, and a link assembly to couple the engine to the gearbox, the link assembly including a male link coupled to the engine or the gearbox, a female link coupled to the engine or the gearbox, wherein the female link receives the male link to allow translation of the male link relative to the female link and to form a radial interface, wherein the radial interface dampens translation of the male link relative to the female link, and a pin releasably coupled to the male link and the female link to selectively retain the male link and the female link.

Technical function of the embodiments described above includes that the female link receives the male link to allow translation of the male link relative to the female link and to form a radial interface, wherein the radial interface dampens translation of the male link relative to the female link, and a pin releasably coupled to the male link and the female link to selectively retain the male link and the female link.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
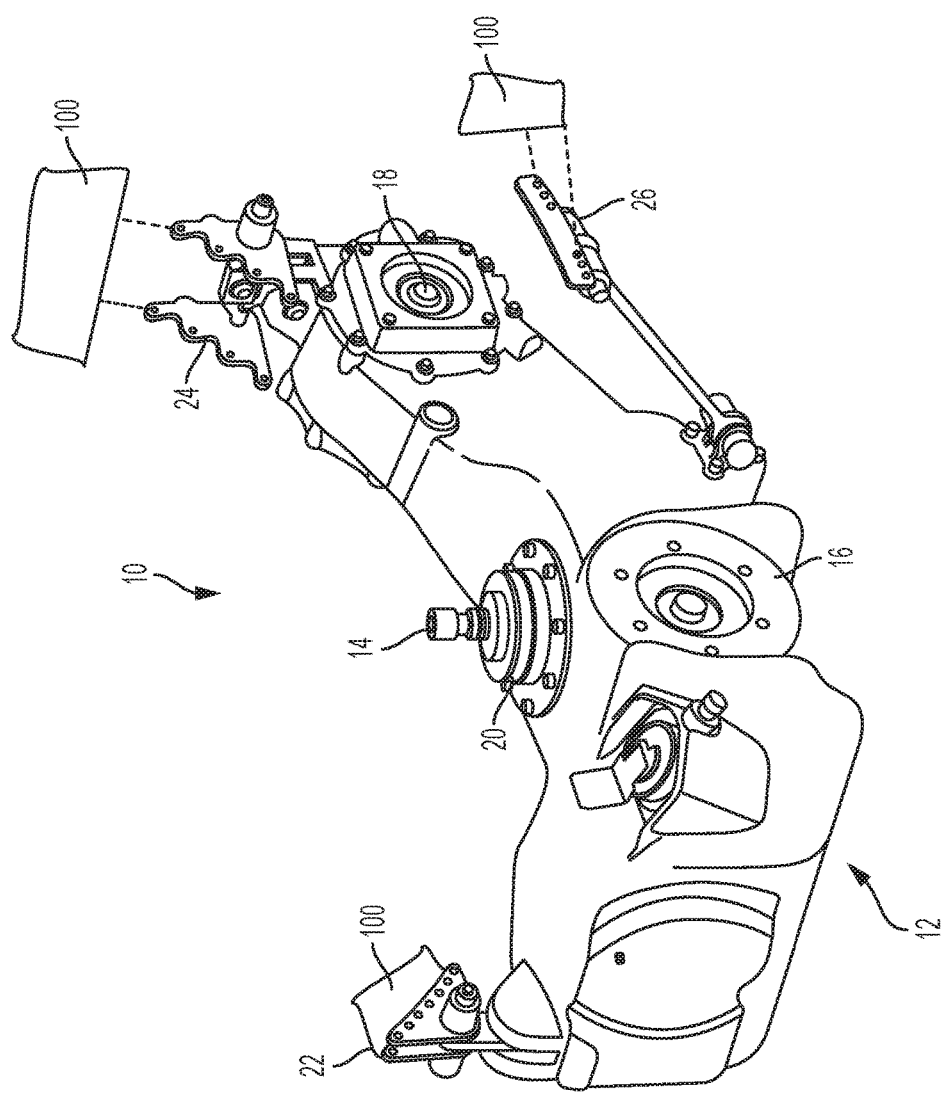
FIG. 1 is a perspective view of one embodiment of an auxiliary gearbox for a gas turbine engine.

Referring to the drawings, FIG. 1 is a perspective view of a gearbox assembly 10, which includes a gearbox 12 and supporting elements sufficient to secure the gearbox 12 with respect to the engine 100. The engine 100 is depicted only schematically, and can, for example, be an aircraft gas turbine engine with a structural engine case, or another engine component to which the gearbox 12 is secured. The gearbox assembly 10 includes driveshaft connection 14, peripheral load connections 16 and 18, seal 20, and mounting links 22, 24, and 26. The gearbox 12 can, for example, be an auxiliary gearbox disposed to transmit torque from the engine 100 to a variety of peripheral loads not directly related to operation of the engine 100 or to propulsion (e.g. to a generator or air circulation system).

A driveshaft connection 14 attaches to a shaft of the engine 100 for torque transmission. The peripheral load connections 16 and 18 are two illustrative auxiliary driveshaft connection points for attachment of peripheral loads to the gearbox 12. Peripheral loads can include any systems driven by, but not included within, the engine 100, including but not limited to air circulation systems and electrical generators. Although only two peripheral load connections 16 and 18 are depicted in FIG. 1, the gearbox 12 can more generally support any number and location of peripheral load connections.

Seal 20 and mounting links 22, 24, and 26 collectively constrain the gearbox 12 with respect to the gas turbine engine structure 100 in all six translational and rotational degrees of freedom, without over constraining the gearbox 12. The seal 20 can for example, be a spigot-type annular seal that constrains the gearbox 12 in two degrees of freedom corresponding to the normal basis of the reference plane on which the seal 20 lies. In the depicted embodiment, mounting links 22 and 26 each provide a single independent degree of constraint, while the mounting link 24 provides two more independent degrees of constraint. More generally, the collection of all linkages connecting the gearbox 12 to the engine 100 including the seal 20, as well as provides a total of six independent constraints on the translational and rotational freedom of the gearbox 12 with respect to the engine 100. In alternative embodiments, these constraints can be distributed about more or fewer separate linkages. The independence of these constraints prevents overconstraint (e.g. two links constraining the same degree of freedom) that would necessitate tighter tolerances and could increase damage done to the gearbox and/or the linkages in the event of severe impacts. The locations and number of degrees of freedom constrained by each linkage may vary across different embodiments, so long as the collection of all linkages constrains all six degrees of freedom without significantly overconstraining any.

Figure 2:
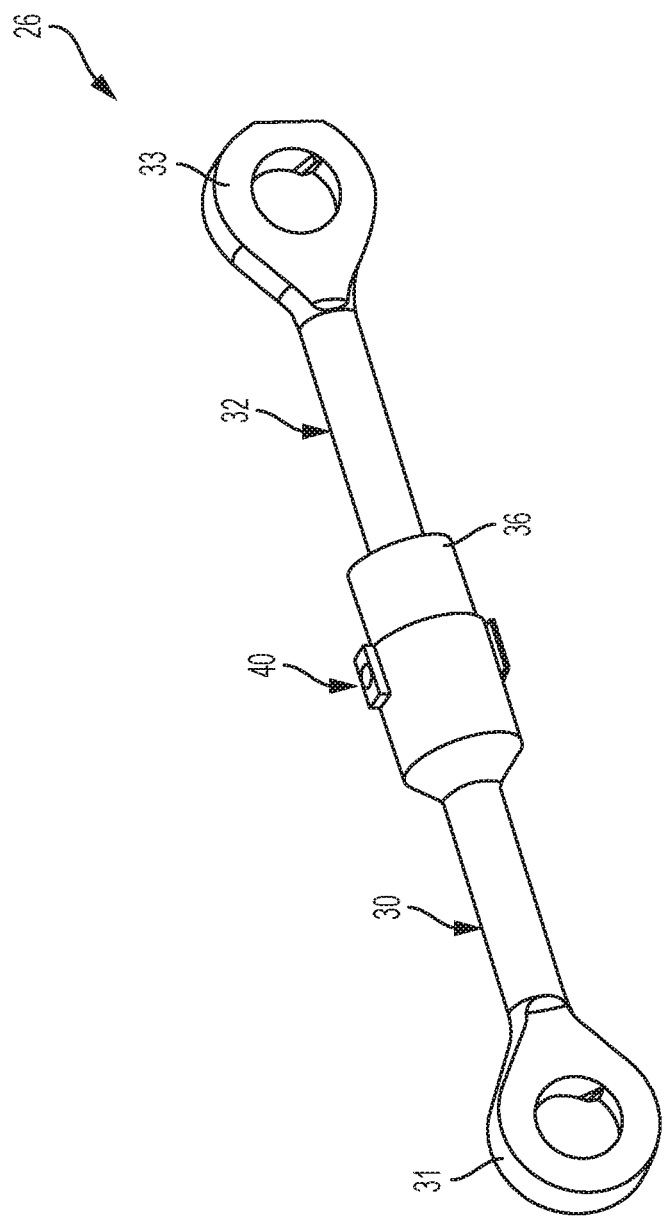
FIG. 2 is a perspective view of one embodiment of a mounting link for use with the auxiliary gearbox of FIG. 1.
Figure 3:
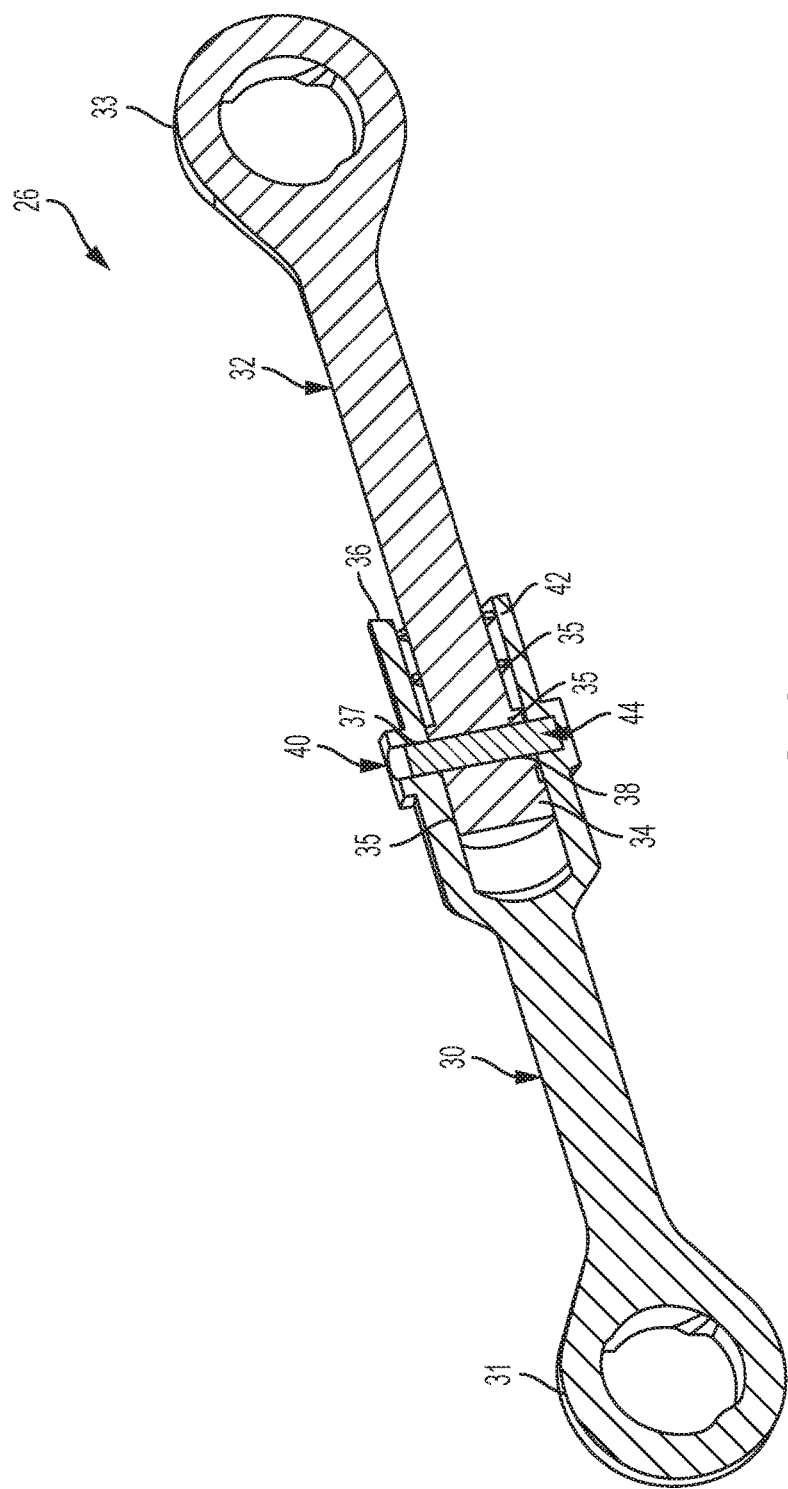
FIG. 3 is a perspective cross-sectional view of the mounting link of FIG. 2.

Referring to FIGS. 2 and 3, the mounting link 26 is shown. In the illustrated embodiment, the mounting link 26 includes a female link 30, a male link 32, and a pin 35. The mounting link 26 can be utilized as a medium to long link to connect the engine 100 to an associated structure, such as the gearbox 12, as shown in FIG. 1. The mounting link 26 can rigidly constrain one degree of freedom between the engine 100 and the gearbox 12. In the illustrated embodiment, extreme loads may break the rigid constraint of the mounting link 26 by shearing the pin 44 to allow a permitted range of motion. In the illustrated embodiment, the interface between the female link 30 and the male link 32 can dampen the relative motion within the permitted range of motion. Referring to FIG. 1, the increased and damped mobility of the gearbox 12 relative to the engine 100 allows the mounting link 26 to absorb extreme shocks without either detaching the gearbox 12 from the engine 100 or transmitting potentially destructive loads from the engine 100 to the gearbox 12.

Referring back to FIGS. 2 and 3, in the illustrated embodiment, the female link 30 includes a link mounting end 31 and a link interface end 36. The female link 30 can be formed with any suitable geometry and formed from any suitable material. In the illustrated embodiment, the link mounting end 31 can include a feature to attach or otherwise couple to a component such as the engine 100 or the gearbox 12 as shown in FIG. 1. In the illustrated embodiment, the link mounting end 31 includes a hole to allow a bolt or feature of a component to pass through to attach the female link 30 to the component. In the illustrated embodiment, the opposite end of the female link 30 is the link interface end 36. The link interface end 36 includes a cavity to receive the male link 32. The male link 32 can translate relative to the female link 30 after the pin 44 is broken or otherwise released.

In the illustrated embodiment, the male link 32 includes a link mounting end 33 and a link interface end 34. The male link 32 can be formed with any suitable geometry and formed from any suitable material. In the illustrated embodiment, the link mounting end 33 can include a feature to attach or otherwise couple to a component such as the engine 100 or the gearbox 12 as shown in FIG. 1. In the illustrated embodiment, the male link 32 is attached to the corresponding component that female link 30 is not attached to link two components. For example, the female link 30 may be attached to the engine 100 while the male link 32 is attached to the gearbox 12. In the illustrated embodiment, the link mounting end 33 includes a hole to allow a bolt or feature of a component to pass through to attach the male link 32 to the component. In the illustrated embodiment, the opposite end of the male link 32 is the link interface end 34. The link interface end 34 is received by the female link 30 in the link interface end 36 of the female link 30. The male link 32 can translate relative to the female link 30 after the pin 44 is broken or otherwise released.

In the illustrated embodiment, the pin 44 selectively prevents the relative translation of the female link 30 and the male link 32. In the illustrated embodiment, the pin 44 passes through a through hole 37 of the female link 30 and a through hole 38 of the male link 32 to engage and retain the female link 30 and the male link 32. In certain embodiments, the through hole 37 of the female link 30 and the through hole 38 of the male link 32 are axially aligned. In the illustrated embodiment, the through hole 37 and the through hole 38 are disposed near the link interface end 36 of the female link 30 and link interface end 34 of the male link 32. In the illustrated embodiment, the pin 44 can be in an interference fit with the female link 30 and the male link 32. In the illustrated embodiment, the mounting link 26 can further include a plug 40. The plug 40 can axially retain the pin 44. The plug 40 can be disposed or otherwise fit within the through hole 37 in addition to the pin 40 to prevent the unintentional removal of the pin 44.

In the illustrated embodiment, the pin 44 can serve as a fusible link. In certain embodiments, the pin 44 can shear when a sufficiently strong shock or heavy load is applied. In certain embodiments, a shear plane can be predefined to provide a designated area to allow the pin 44 to shear. In certain embodiments, the pin 44 can be formed of a less durable material than the female link 30 and the male link 32 to facilitate the desired shear characteristics.

In the illustrated embodiment, the pin 44 is designed to shear at a known load magnitude corresponding to the maximum structural capability of the gearbox assembly 12, the unfused mount components, and the engine mounting structure 100, as shown in FIG. 1. This can be accomplished by selecting an appropriately durable diameter and material for the pin 44, and/or by priming the pin 44 for shear with suitably shaped shear initiation points. In general, the pin 44 must be at least strong enough to withstand peak non-destructive impact loads such as low cycle loads from hard landings and other non-routine but expected shocks. These loads can, for example, reach 10-15 Gs. In at least some embodiments, the pin 44 will not break until loads at least 10-25 times higher than expected low cycle loads are experienced. Very few loads experienced during aircraft engine operation reach these levels, but shocks due to blade-off events can be high enough to shear the pin 44.

After an event that can cause the pin 44 to shear, fuse, or otherwise release, the female link 30 and the male link 32 are allowed to translate relative to each other. In the illustrated embodiment, the female link 30 and the male link 32 can translate generally axially. Advantageously, mounting link 26 limits or prevents damage that could otherwise be done to gearbox 12 and its attached peripherals by transmitting such extreme loads, while simultaneously helping to prevent gearbox 12 from detaching from engine 100 (FIG. 1).

In the illustrated embodiment, the female link 30 and the male link 32 are in contact at the radial interface 35 between the link interface end 36 and the link interface end 34. As the female link 30 and the male link 32 translate, the frictional radial interface 35 between the female link 30 and the male link 32 provides coulomb damping to dissipate energy created by the translation. In the illustrated embodiment, the amount of coulomb damping provided by the radial interface is determined by the coefficient of friction, the geometry, and the contact areas of the female link 30 and the male link 32. In certain embodiments, the materials of the female link 30 and the male link 32 are selected to provide the desired level of coulomb damping. In certain embodiments, the damping force provided by the radial interface 35 is greater than the force required to shear the pin 44. In other embodiments, the damping force provided by the radial interface 35 is less than the force required to shear the pin 44.

In the illustrated embodiment, the snap ring 42 can be utilized to limit the relative travel of the male link 32 within the female link 30. In the illustrated embodiment, the snap ring 42 can be installed after the male link 32 is disposed within the female link 30 to retain the male link 32 at the end of the travel range to prevent the mounting link 26 from separating after the pin 44 is sheared.

Advantageously, the use of the pin 44 and the coulomb damping provided by the radial interface 35 obviates the need for all linkages and peripheral connections to be capable of surviving the extreme loads produced during fan blade-off events, which would otherwise either be entirely infeasible, or would dramatically increase the weight and mass of material required to adequately reinforce associated systems. Fan blade-off events necessitate maintenance to repair or replace damaged engine components, and the pin 44 can be replaced with an intact pin 44 during maintenance following any shock sufficient to break the pin 44.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A link assembly between an engine and a gearbox, the link assembly comprising:
    a male link comprising a male link mounting end configured to be coupled to one of the engine and the gearbox, a male shaft extending from the male link mounting end and a male link interface end at a distal end of the male shaft;
    a female link comprising a female link mounting end configured to be coupled to the other of the engine and the gearbox a female shaft extending from the female link mounting end and a female link interface end at a distal end of the female shaft,
    wherein an external width of the female link interface end exceeds an external width of the female shaft such that the female link interface end defines a cavity with an interior width sized such that the female link interface end receives the male link interface end to allow translation of the male link relative to the female link and to form a radial interface of the male and female link interface ends, and
    wherein the radial interface dampens translation of the male link relative to the female link;
    a pin releasably coupled to the male and female link interface ends to selectively retain the male link and the female link; and
    a snap ring to limit translation of the male link relative to the female link.

2. The link assembly of claim 1, wherein the pin is a shear pin configured to shear at a predetermined load.

3. The link assembly of claim 2, wherein the predetermined load is less than a damping force of the radial interface.

4. The link assembly of claim 1, wherein the female link interface end includes a female link through hole to receive the pin.

5. The link assembly of claim 4, wherein the male link interface end includes a male link through hole to receive the pin, wherein the male link through hole is axially aligned with the female link through hole.

6. The link assembly of claim 1, wherein the male link mounting end is coupled to the other of the engine and the gearbox.

7. The link assembly of claim 1, wherein the female link mounting end is coupled to the one of the engine and the gearbox.

8. The link assembly of claim 1, wherein the radial interface dampens translation via coulomb dampening.

9. A link assembly between an engine and a gearbox, the link assembly comprising:
    a male link comprising a male link mounting end configured to be coupled to one of the engine and the gearbox, a male shaft extending from the male link mounting end and a male link interface end at a distal end of the male shaft;
    a female link comprising a female link mounting end configured to be coupled to the other of the engine and the gearbox a female shaft extending from the female link mounting end and a female link interface end at a distal end of the female shaft,
    wherein an external width of the female link interface end exceeds an external width of the female shaft such that the female link interface end defines a cavity with an interior width sized such that the female link interface end receives the male link interface end to allow translation of the male link relative to the female link and to form a radial interface of the male and female link interface ends, and
    wherein the radial interface dampens translation of the male link relative to the female link;
    a pin releasably coupled to the male and female link interface ends to selectively retain the male link and the female link,
    wherein the female link interface end includes a female link through hole to receive the pin; and
    a plug at least partially disposed within the female link through hole to axially retain the pin.

10. A gearbox assembly, comprising:
    an engine;
    a gearbox; and
    a link assembly to couple the engine to the gearbox, the link assembly comprising:
    a male link comprising a male link mounting end coupled to one of the engine and the gearbox, a male shaft extending from the male link mounting end and a male link interface end at a distal end of the male shaft;
    a female link comprising a female link mounting end coupled to the other of the engine and the gearbox, a female shaft extending from the female link mounting end and a female link interface end at a distal end of the female shaft,
    wherein an external width of the female link interface end exceeds an external width of the female shaft such that the female link interface end defines a cavity with an interior width sized such that the female link interface end receives the male link interface end to allow translation of the male link relative to the female link and to form a radial interface of the male and female link interface ends, and
    wherein the radial interface dampens translation of the male link relative to the female link;
    a pin releasably coupled to the male and female link interface ends to selectively retain the male link and the female link; and
    a snap ring to limit translation of the male link relative to the female link.

11. The gearbox assembly of claim 10, wherein the pin is a shear pin configured to shear at a predetermined load.

12. The gearbox assembly of claim 11, wherein the predetermined load is less than a damping force of the radial interface.

13. The gearbox assembly of claim 10, wherein the female link interface end includes a female link through hole to receive the pin.

14. A gearbox assembly, comprising:
- an engine;
- a gearbox; and
- a link assembly to couple the engine to the gearbox, the link assembly comprising:
- a male link comprising a male link mounting end coupled to one of the engine and the gearbox, a male shaft extending from the male link mounting end and a male link interface end at a distal end of the male shaft;
- a female link comprising a female link mounting end coupled to the other of the engine and the gearbox, a female shaft extending from the female link mounting end and a female link interface end at a distal end of the female shaft,
- wherein an external width of the female link interface end exceeds an external width of the female shaft such that the female link interface end defines a cavity with an interior width sized such that the female link interface end receives the male link interface end to allow translation of the male link relative to the female link and to form a radial interface of the male and female link interface ends, and
- wherein the radial interface dampens translation of the male link relative to the female link;
- a pin releasably coupled to the male and female link interface ends to selectively retain the male link and the female link,
- wherein the female link interface end includes a female link through hole to receive the pin; and
- a plug at least partially disposed within the female link through hole to axially retain the pin.

15. The gearbox assembly of claim 13, wherein the male link interface end includes a male link through hole to receive the pin, wherein the male link through hole is axially aligned with the female link through hole.

16. The gearbox assembly of claim 10, wherein the male link mounting end is coupled to the other of the engine and the gearbox.

17. The gearbox assembly of claim 10, wherein the female link mounting end is coupled to the one of the engine and the gearbox.

18. The gearbox assembly of claim 10, wherein the radial interface dampens translation via coulomb dampening.

* * * * *